(12) United States Patent
Mullaney et al.

(10) Patent No.: US 8,958,672 B2
(45) Date of Patent: Feb. 17, 2015

(54) OPTICAL FIBER FAN-OUT DEVICE FOR A FURCATION TUBE ASSEMBLY

(71) Applicant: Tyco Electronics Corporation, Berwyn, PA (US)

(72) Inventors: Julian S. Mullaney, Raleigh, NC (US); Eric E. Alston, Fuquay-Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/957,880

(22) Filed: Aug. 2, 2013

(65) Prior Publication Data
US 2014/0037255 A1    Feb. 6, 2014

Related U.S. Application Data

(60) Provisional application No. 61/679,268, filed on Aug. 3, 2012.

(51) Int. Cl.
*G02B 6/44*    (2006.01)

(52) U.S. Cl.
CPC ............ *G02B 6/4471* (2013.01); *G02B 6/4459* (2013.01)
USPC ....................................................... 385/100

(58) Field of Classification Search
USPC ........................... 385/100–109, 137, 139, 147
See application file for complete search history.

(56) References Cited

U.S. PATENT DOCUMENTS

| 5,377,286 | A | 12/1994 | Iida et al. |
| 6,061,492 | A | 5/2000 | Strause et al. |
| 6,421,493 | B1 | 7/2002 | Burek et al. |
| 6,816,663 | B2 | 11/2004 | Daoud |
| 7,461,981 | B2 | 12/2008 | Yow, Jr. et al. |
| 2008/0138026 | A1* | 6/2008 | Yow et al. ............ 385/137 |
| 2010/0014810 | A1 | 1/2010 | Eberle et al. |

FOREIGN PATENT DOCUMENTS

| KR | 10-0191211 | * | 6/1999 |
| KR | 10-0191211 B1 | | 6/1999 |

OTHER PUBLICATIONS

International Search Report and Written Opinion for PCT/US2013/052466 mailed Nov. 26, 2013.

* cited by examiner

*Primary Examiner* — Akm Enayet Ullah
(74) *Attorney, Agent, or Firm* — Merchant & Gould P.C.

(57) ABSTRACT

The present disclosure relates to an optical fiber fan-out device having a furcation tube assembly. The furcation tube assembly includes a furcation tube mounting insert and an array of furcation tubes. The first end of the furcation tube mounting insert has a first end surface being a slant configuration at an oblique angle relative to the furcation tube axes. The slanted edge helps to insert optical fibers into the furcation tubes. The supported portions of the furcation tubes have fiber insertion ends that terminate at the first end surface. The furcation tubes also including free portions that extend from the second end of the furcation tube mounting insert.

20 Claims, 10 Drawing Sheets

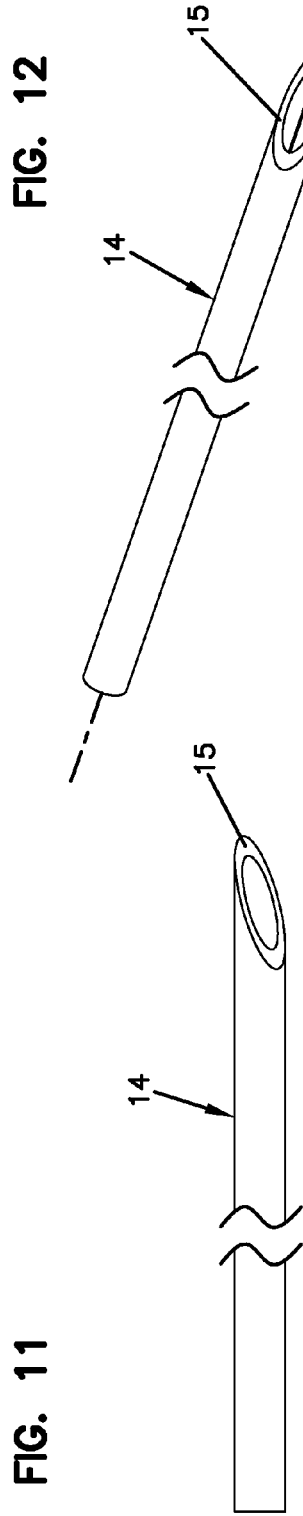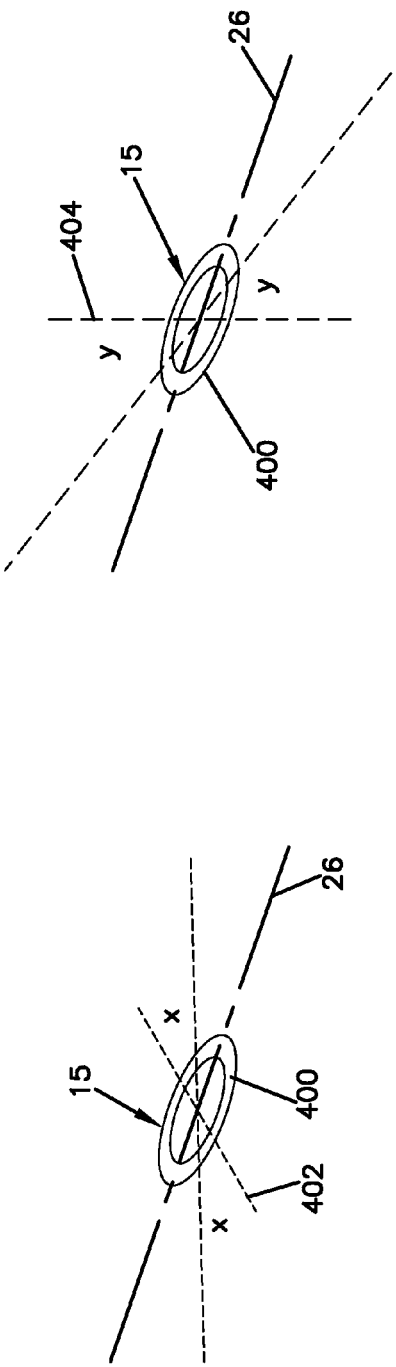

OPTICAL FIBER FAN-OUT DEVICE FOR A FURCATION TUBE ASSEMBLY

CROSS-REFERENCE TO RELATED APPLICATION

This application claims the benefit of U.S. Provisional Patent Application Ser. No. 61/679,268, filed Aug. 3, 2012, which application is hereby incorporated by reference in its entirety.

TECHNICAL FIELD

The present disclosure relates to fiber fan-out devices used in fiber optic networks.

BACKGROUND

In a fiber optic telecommunication network, a fan-out device is used to distribute optical fibers from a multi-fiber cable or tube containing multiple fibers to a plurality of individual furcation tubes. Fan-out devices are disclosed at, for example, U.S. Pat. No. 7,461,981 to Yow, Jr. et al., U.S. Pat. No. 6,816,663 to Daoud and U.S. Pat. No. 6,061,492 to Strause et al.

SUMMARY

The present disclosure relates to an optical fiber fan-out device having a furcation tube assembly. The furcation tube assembly includes a furcation tube mounting insert and an array of furcation tubes. The furcation tubes have supported portions secured within the furcation tube mounting insert. The supported portions of the furcation tubes define parallel furcation tube axes. The first end of the furcation tube mounting insert has a first end surface that is slanted at an oblique angle relative to the furcation tube axes. The slanted edge helps to insert optical fibers into the furcation tubes. The supported portions of the furcation tubes have fiber insertion ends that terminate at the first end surface. The furcation tubes also including free portions that extend outwardly from the second end of the furcation tube mounting insert.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 11 is a perspective view of one of the furcation tubes of the furcation tube assembly of FIG. 1;

FIG. 12 is another perspective view of one of the furcation tubes of the furcation tube assembly of FIG. 1;

FIG. 13 is a perspective view of the end face of the furcation tube of FIGS. 11 and 12; and FIG. 14 is another perspective view of the end face of the furcation tube of FIGS. 11 and 12.

DETAILED DESCRIPTION

Figure 1:
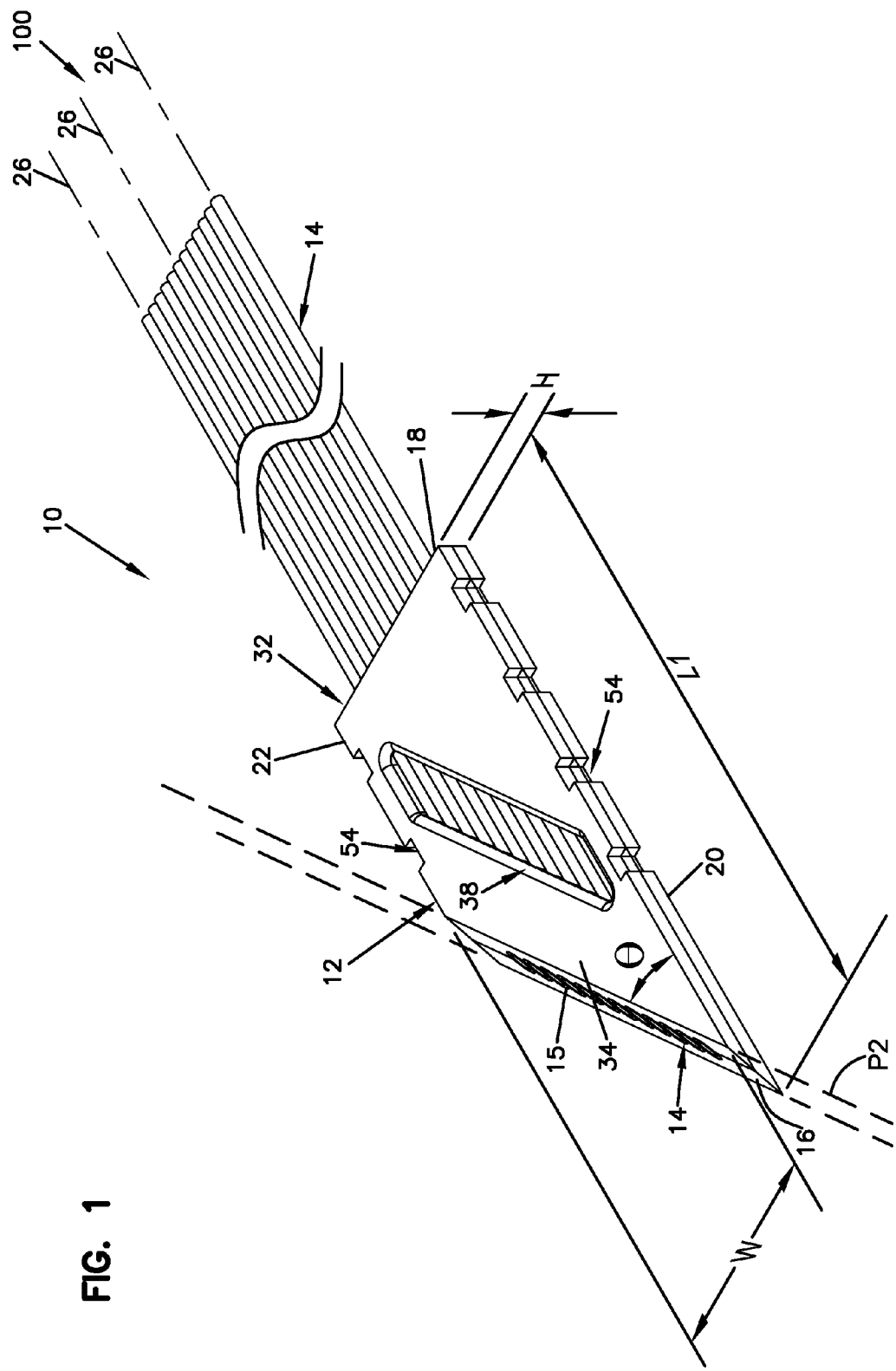
FIG. 1 is a top, perspective view of a furcation tube assembly in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible examples of how inventive aspects in accordance with the principles of the present disclosure may be embodied.

Figure 2:
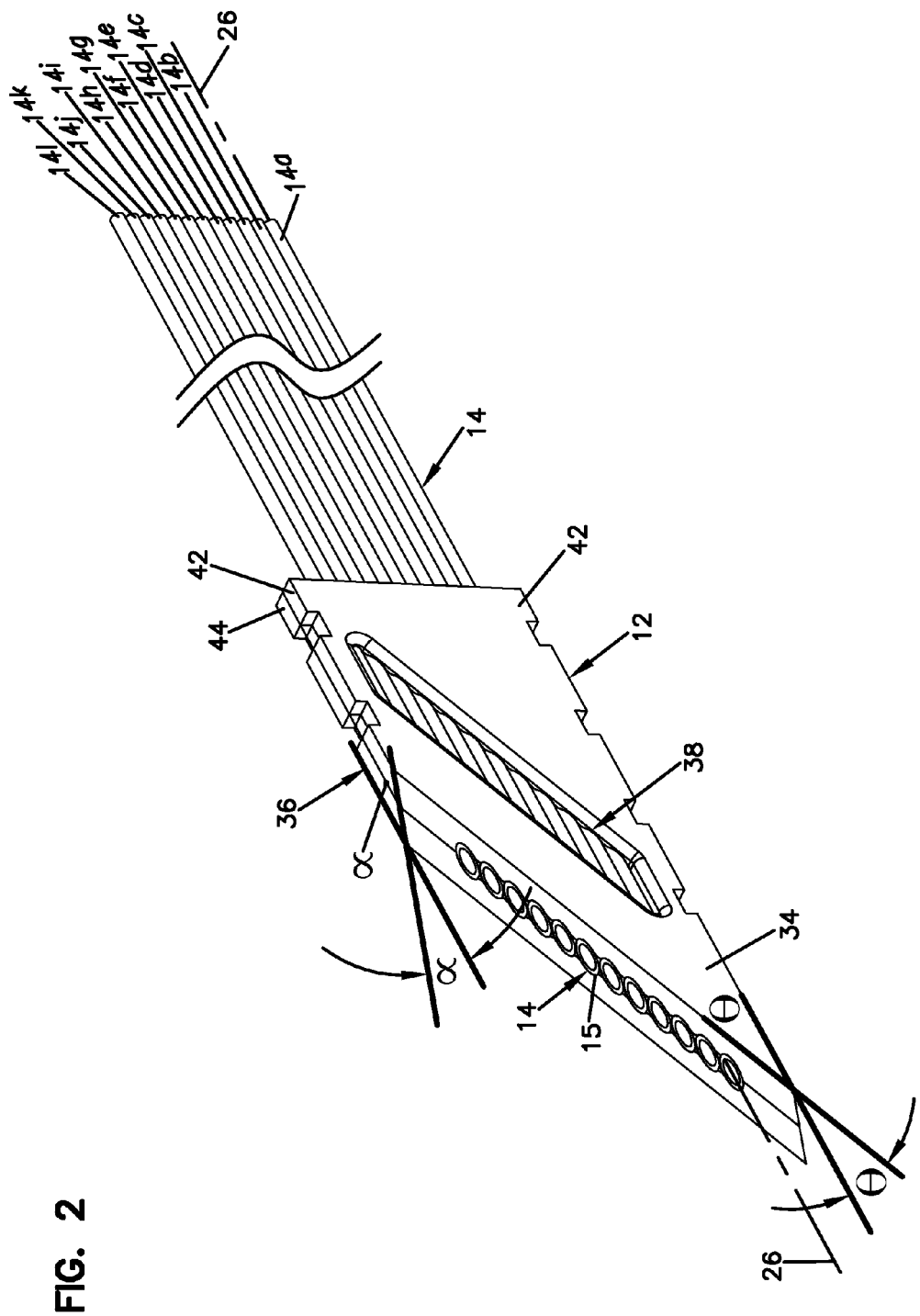
FIG. 2 is a perspective view of the furcation tube assembly of FIG. 1.
Figure 3:
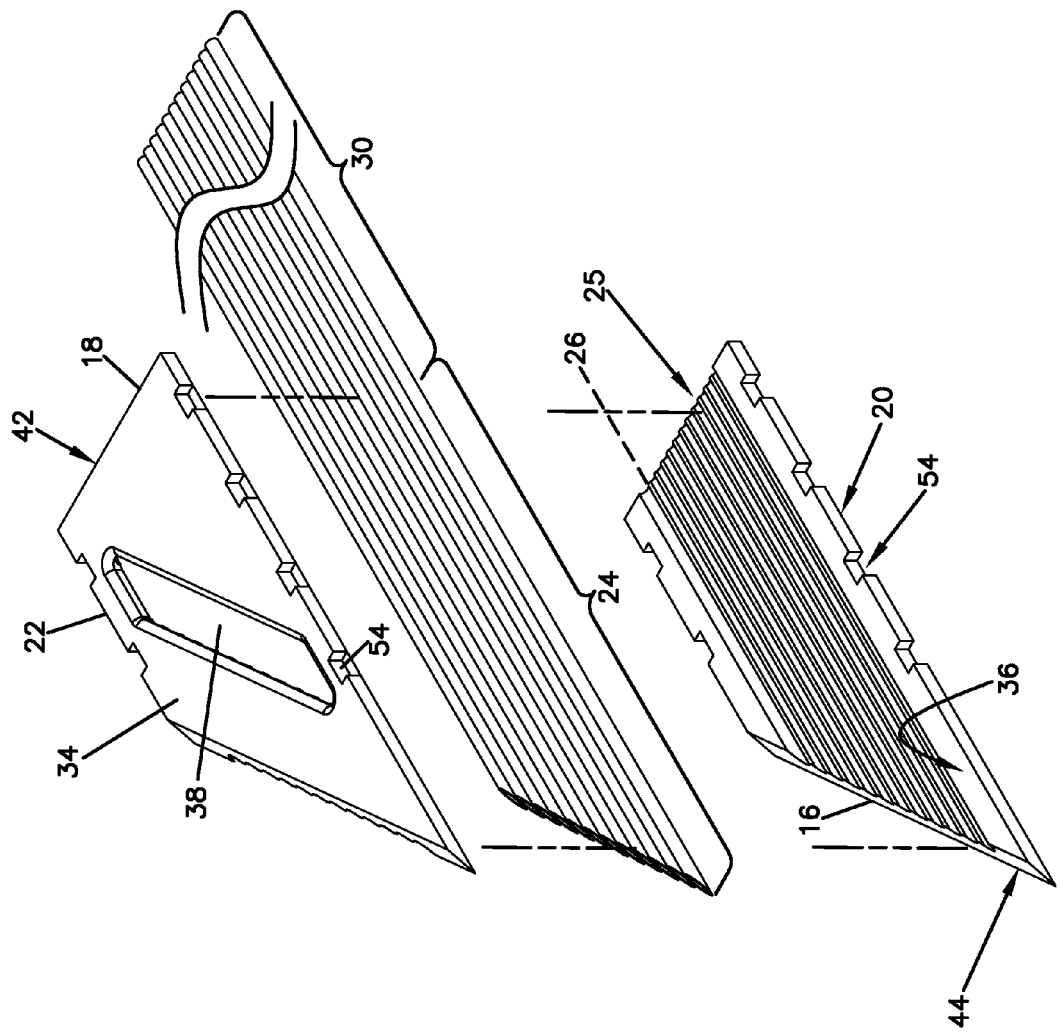
FIG. 3 is an exploded view of the furcation tube assembly of FIG. 1.

Referring to FIGS. 1-3, an optical fiber fan-out device 100 having a furcation tube assembly 10 in accordance with the principles of the present disclosure is illustrated. The furcation tube assembly 10 includes a furcation tube mounting insert 12 and an array of furcation tubes 14. The furcation tube mounting insert 12 includes a first end 16 and a second end 18 positioned opposite from the first end 16. The furcation tube mounting insert 12 also includes a first side 20 and a second side 22 positioned opposite from the first side 20. The furcation tube assembly 10 has a length L1 that extends between the first end 16 and the second end 18 of the furcation tube mounting insert 12. The first and second sides 20, 22 of the furcation tube mounting insert 12 extend along the length L1 of the furcation tube mounting insert 12. The furcation tube assembly 10 also includes a width W1 that extends between the first side 20 and the second side 22 of the furcation tube mounting insert 12. The width W1 of the furcation tube mounting insert 12 is perpendicular relative to the length L1 of the furcation tube mounting insert 12.

The furcation tubes 14 of the furcation tube assembly 10 can have supported portions 24 and free portions 30. The free portions 30 of the furcation tubes 14 may extend outwardly from the second end 18 of the furcation tube mounting insert 12. The free portions 30 may have a length greater than 2 feet. Of course, other lengths can be used as well to fit particular applications. The supported portions 24 may be secured within the furcation tube mounting insert 12 (e.g., by an adhesive material or mechanically by friction or other means). The furcation tube mounting insert 12 can include a first piece 42 and a second piece 44. The supported portions 24 are arranged and configured to be secured between the first and second pieces 42, 44 of the furcation tube mounting insert 12. As shown, the first and second pieces 42, 44 of the furcation tube mounting insert 12 can be arranged and configured so as to cooperate to define the first end 16, the second end 18, the first side 20, and the second side 22 of the furcation tube mounting insert 12.

Figure 9:
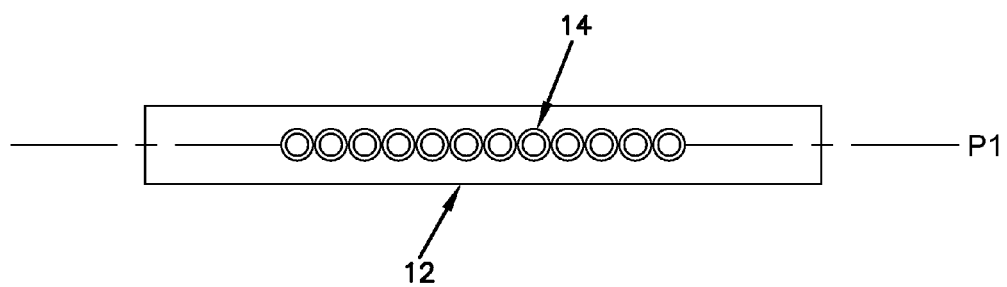
FIG. 9 is a fiber insertion end view of the furcation tube assembly of FIG. 1.

The supported portions 24 may define furcation tube axes 26 within the furcation tube mounting insert 12. The furcation tube mounting insert 12 may define parallel, inferior grooves 25 for receiving the furcation tubes 14. Half portions of each of the grooves 25 may be formed by the first and second pieces 42, 44. As shown, the furcation tube axes 26 extend parallel along the length L1 of the furcation tube mounting insert 12. The furcation tube axes 26 may be aligned along a plane P1 (see FIG. 9) extending across the width W1 of the furcation tube mounting insert 12.

In one aspect, the first end 16 of the furcation tube mounting insert 12 can include a first end surface 28. The first end surface 28 may extend across the width W1 of the furcation tube mounting insert 12 between the first and second sides 20, 22 of the furcation tube mounting insert 12. As shown, the first end surface 28 slants at an oblique angle θ relative to the furcation tube axes 26 as the first end surface 28 extends across the width W1 of the furcation tube mounting insert 12. The oblique angle can be in the range of 15 degrees to 45 degrees. Of course, other angles are applicable as well. It is understood that other configurations may be used according to the principles disclosed. The supported portions 24 of the furcation tubes 14 can have fiber insertion ends 15 that terminate at the first end surface 28 of the furcation tube mounting insert 12. The fiber insertion ends 15 can be aligned generally along a plane P2 that is defined by the first end surface 28 and that is aligned at the oblique angle θ relative to the furcation tube axes 26. The plane P2 is also slanted at an incline angle α (see FIG. 2) relative to horizontal so that the first end surface 28 generally has a ramped configuration.

In another aspect, the second end 18 of the furcation tube mounting insert 12 can include a second end surface 32. The second end surface 32 may extend across the width W1 of the furcation tube mounting insert 12. The second end surface 32 can be perpendicular relative to the furcation tube axes 26. It is understood that other configurations may be utilized according to the principles disclosed.

The furcation tube mounting insert 12 can include a third side 34 and a fourth side 36 that is positioned opposite from the third side 34. The third and fourth sides 34, 36 can each extend across the width W1 and length L1 of the furcation tube mounting insert 12 between the first and second sides 20, 22 of the furcation tube mounting insert 12. As shown, the first and second sides 20, 22 are minor sides of the furcation tube mounting insert 12 and the third and fourth sides 34, 36 are major sides of the furcation tube mounting insert 12. The first piece 42 of the furcation tube mounting insert 12 defines the third side 34 of the furcation tube mounting insert 12. The second piece 44 of the furcation tube mounting insert 12 defines the fourth side 36 of the furcation tube mounting insert 12. The third side 34 can be considered a top side and the fourth side 36 can be considered a bottom side.

At least one of the third or fourth sides 34, 36 can define a slot 38. The slot 38 can extend across the width W1 of the furcation tube mounting insert 12. The slot 38 may be slanted at an oblique angle relative to the furcation tube axes 26. Other configurations can be utilized according to the principles disclosed. UV curable adhesive can be used to secure the furcation tubes 14 within the furcation tube mounting insert 12. The slot 38 may be used for curing the UV curable adhesive.

The furcation tube mounting insert 12 also has a height h that extends between the third and fourth sides 34, 36. The plane P2 is angled relative to the third and fourth sides 34, 36 such that the plane P2 slants at the angle α toward the second end 18 of the furcation tube mounting insert 12 as the plane P2 (and the corresponding first end surface 28) extends along the height H from the fourth side 36 (i.e., the bottom side) to the third side 34 (i.e., the top side). The ends 15 of the furcation tubes 14 are angled to coincide with the plane P2 and be flush with the first end surface 28.

Figure 4:
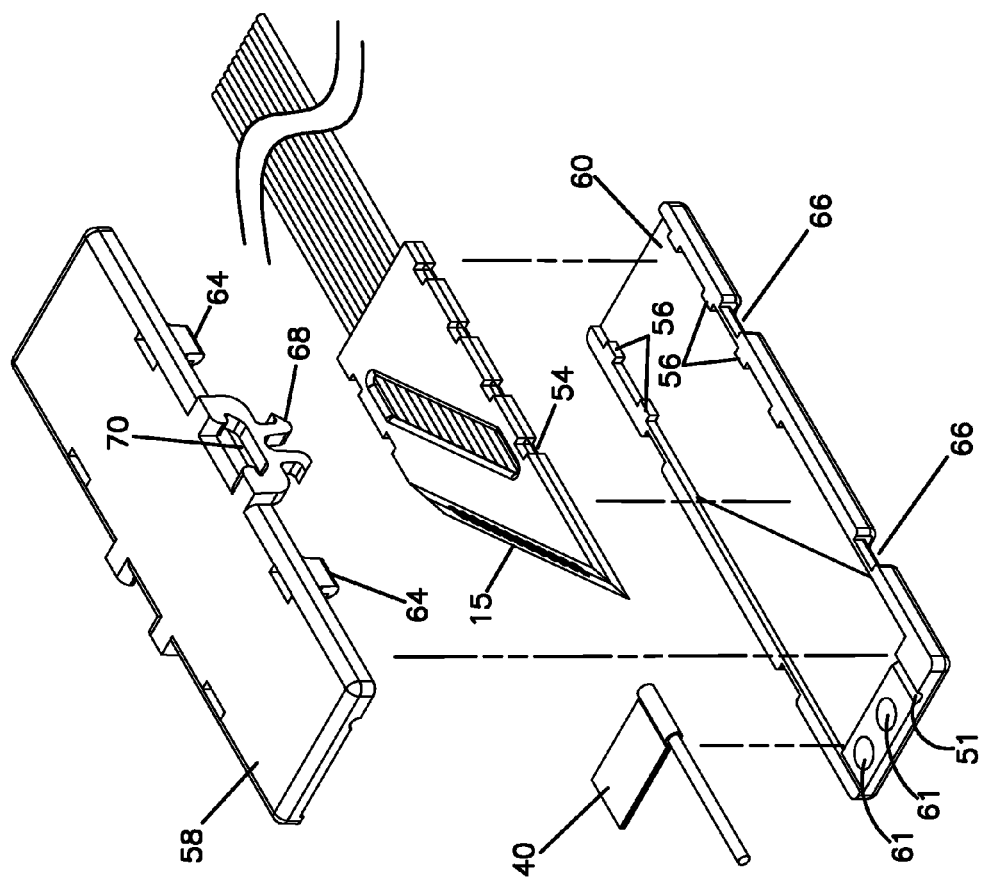
FIG. 4 is an exploded view of a fan-out module in accordance with the principles of the present disclosure.
Figure 5:
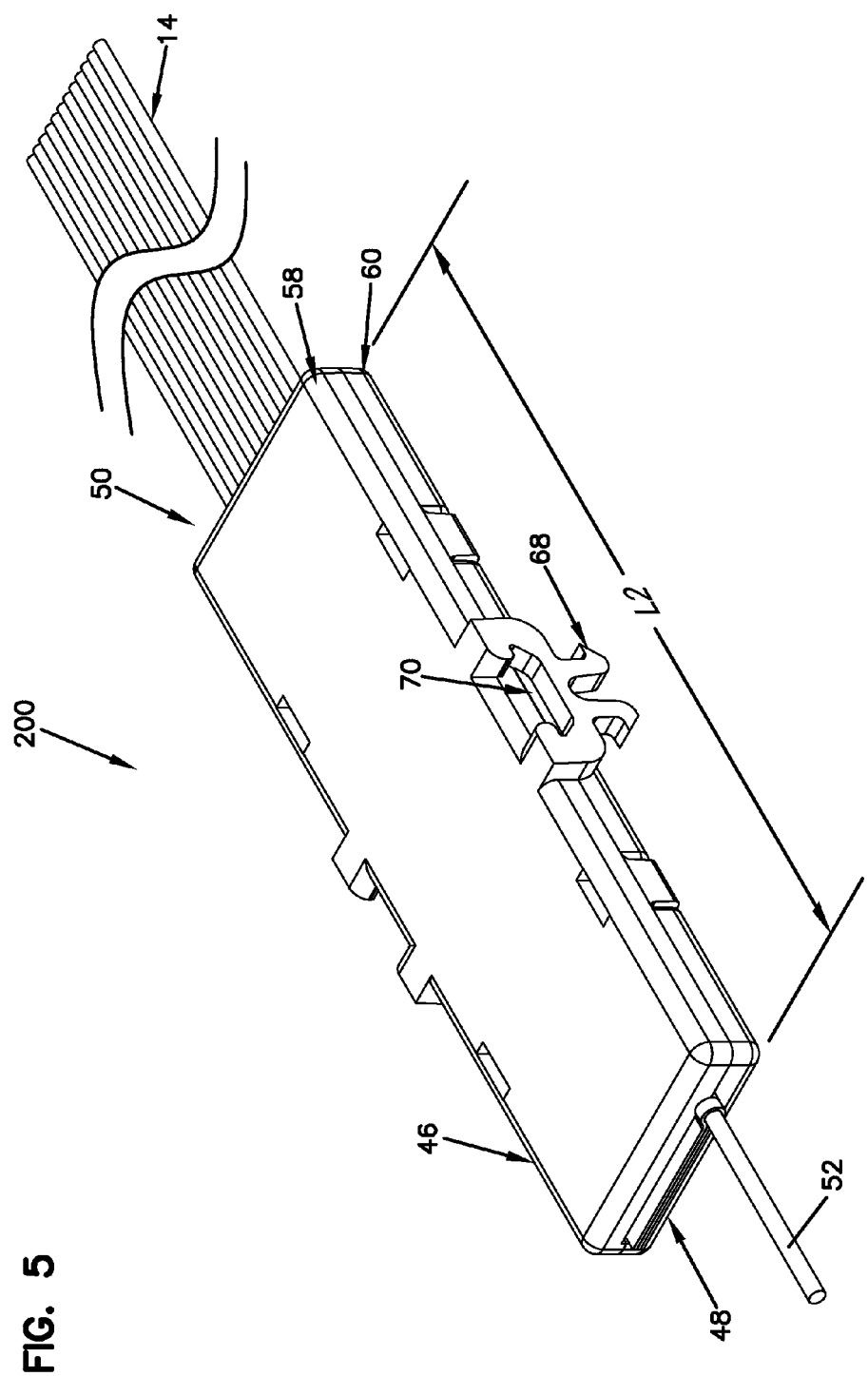
FIG. 5 is an assembled, perspective view of the fan-out module of FIG. 4.
Figure 7:
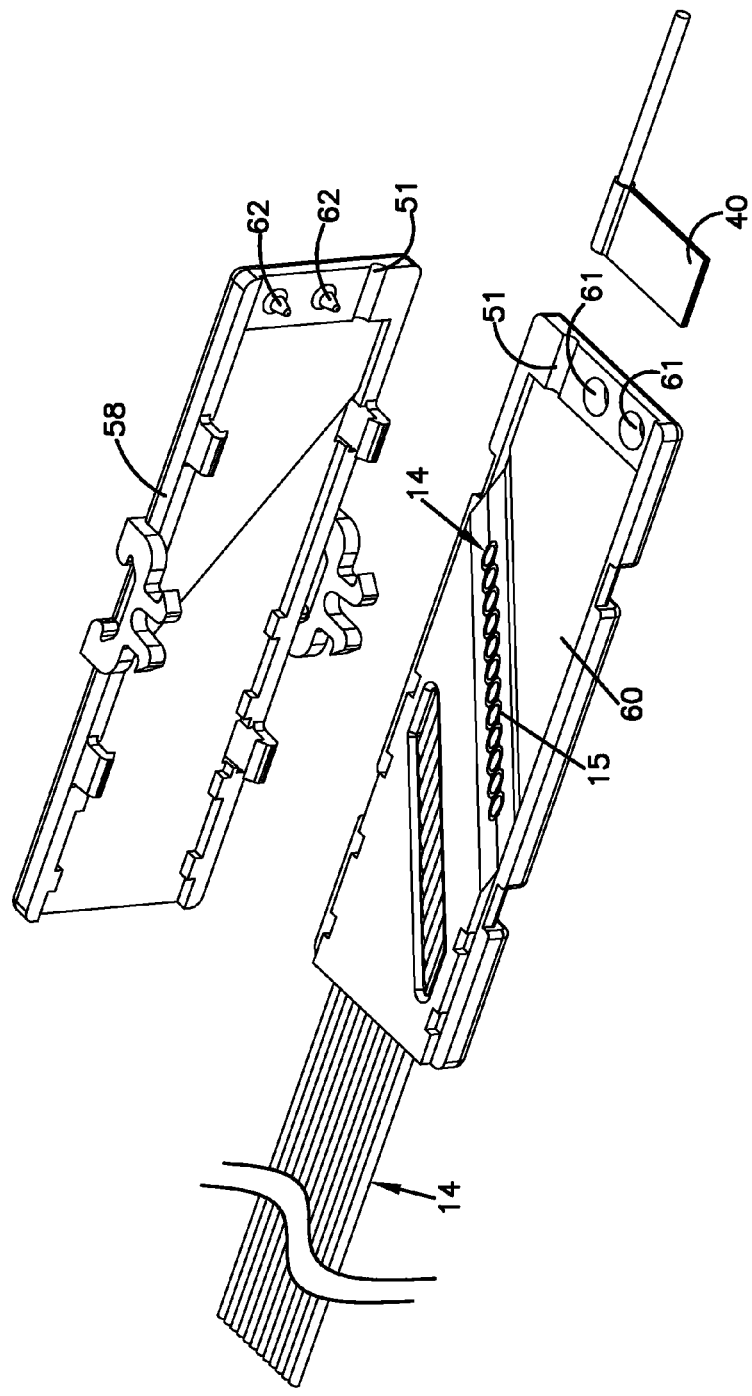
FIG. 7 is another perspective view of the fan-out module of FIG. 4 with the furcation tube assembly loaded in the fan-out module and a top cover of the fan-out module removed.

Referring to FIGS. 4-5, a fan-out module 200 is shown. The fan-out module 200 includes the optical fiber fan-out device 100 and a fan-out housing 46. The fan-out housing 46 can include a cable tube end 48 and a furcation tube end 50. Adhesive tape 40 may be used to secure the cable tube 52 to the cable tube end 48 of the fan-out housing 46. The adhesive tape 40 can be placed between the first and second housing pieces 58, 60. The first housing piece 58 may have tape anchoring projections 62, as shown in FIG. 7, which puncture through the adhesive tape 40 and fit within corresponding openings 61 defined by the second housing piece 60. The adhesive tape 40 may be a double sided adhesive. It is understood that other types of adhesives may be used according to the principles disclosed. Other types of anchoring techniques such as mechanical crimping or clamping can also be used.

The fan-out housing 46 may extend along a length L2 between the cable tube end 48 and the furcation tube end 50. As shown, the fan-out housing 46 is arranged and configured for receiving a cable tube 52. For example, the cable tube end 48 can define an opening 51 for receiving the cable tube 52. The furcation tube mounting insert 12 can be configured to mount within the fan-out housing 46 such that the first end 16 of the furcation tube mounting insert 12 is positioned to face toward the direction of the cable tube end 48 of the fan-out housing 46. The second end 18 of the furcation tube mounting insert 12 is positioned to face toward the direction of the furcation tube end 50 of the fan-out housing 46. The free portions 30 of the furcation tubes 14 can be configured to extend outwardly from the furcation tube end 50 of the fan-out housing 46.

The first and second sides 20, 22 of the furcation tube mounting insert 12 each can include notches 54 that can be configured to receive tabs 56 of the fan-out housing 46 for interlocking the furcation tube mounting insert 12 relative to the fan-out housing 46. This interlocking may limit relative longitudinal movements between the furcation tube mounting insert 12 and the fan-out housing 46. As shown, the tabs 56 are located on the second housing piece 60. The number of tabs 56 shown is six. It is understood that any number of tabs 56 can be utilized and positioned on the fan-out housing 46.

The fan-out housing 46 is depicted as being rectangular in shape and may include a first housing piece 58 and a second housing piece 60. As shown, the furcation tube mounting insert 12 is mounted between the first and second housing pieces 58, 60. The first housing piece 50 defines a first major side of the fan-out housing 46 and the second housing piece 60 defines a second major side of the fan-out housing 46 opposite from the first major side. The first housing piece 58 and the second housing piece 60 are arranged and configured together to define the cable tube end 48 of the fan-out housing 46 and the furcation tube end 50 of the fan-out housing 46. The first housing piece 58 may include latches 64 that can be flexible to snap within catches 66 defined by the second housing piece 60 to latch the first and second housing pieces 58, 60 together. As shown, the latches 64 are arranged and configured on the first housing piece 58 and the catches 66 are arranged and configured on the second housing piece 60. The number of latches 64 and catches 66 are depicted as being four each. It is understood that the latches 64 and catches 66 can vary in number and be positioned without departing from the principles of the present disclosure.

Figure 10:
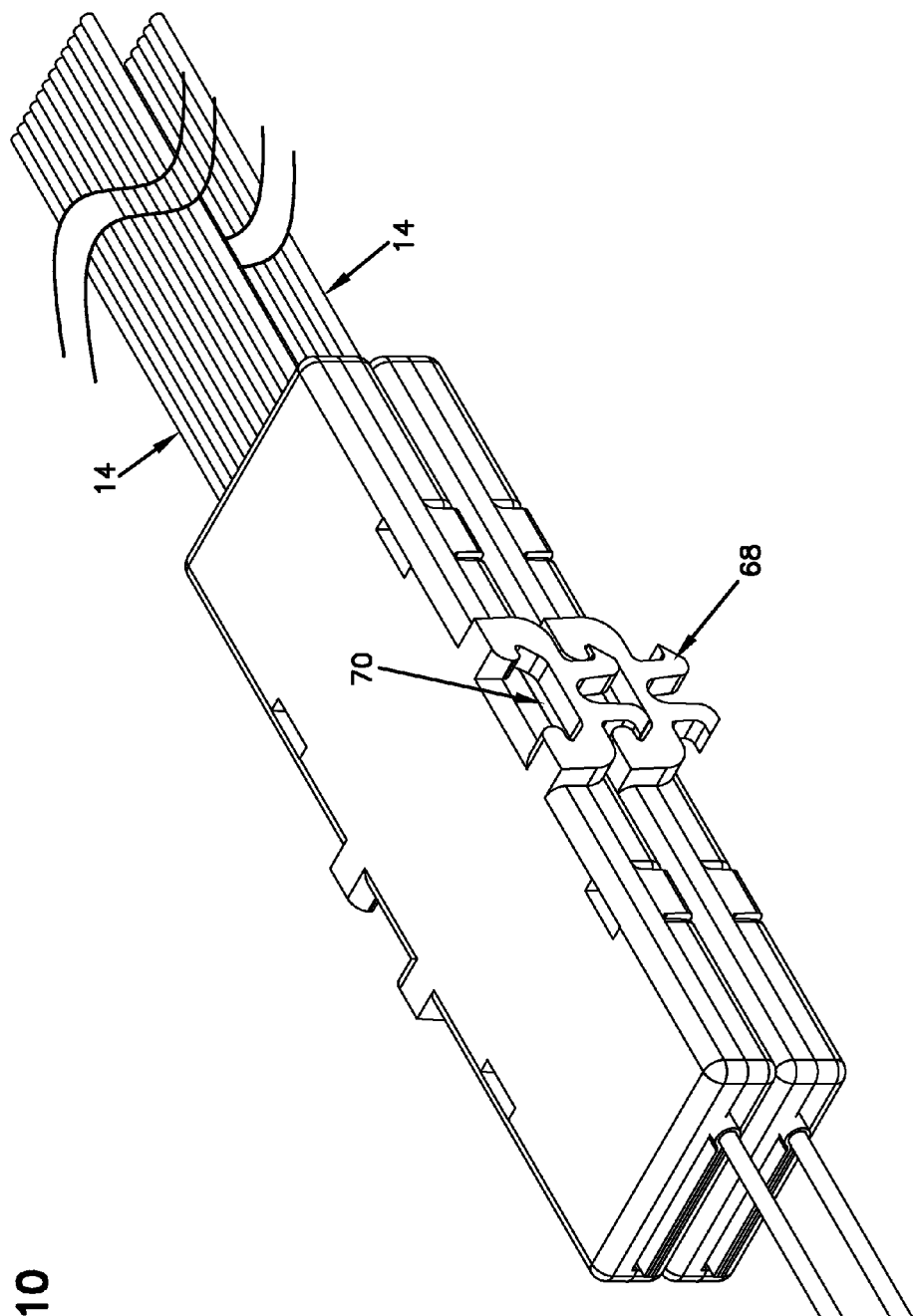
FIG. 10 is a perspective view of a fan-out module in a stack arrangement.

The fan-out housing 46 can include mounting latches 68 for securing the fan-out housing 46 to another optical component. The mounting latches 68 can be located on the first housing piece 58 along the length L2 between the cable tube end 48 and the furcation tube end 50. As shown, the fan-out housing 46 includes two mounting latches 68 positioned at opposite sides of the fan-out housing 46. The number of mounting latches 68 and position of the mounting latches 68 may be varied without departing from the principles of the present disclosure. The fan-out housing 46 may be stacked together using mounting latch receptacles 70 located in the fan-out housing 46. As shown in FIG. 10, the mounting latch receptacles 70 can receive the mounting latches 68 of another fan-out housing 46 to secure the fan-out housings 46 in a stacked relationship.

Figure 6:
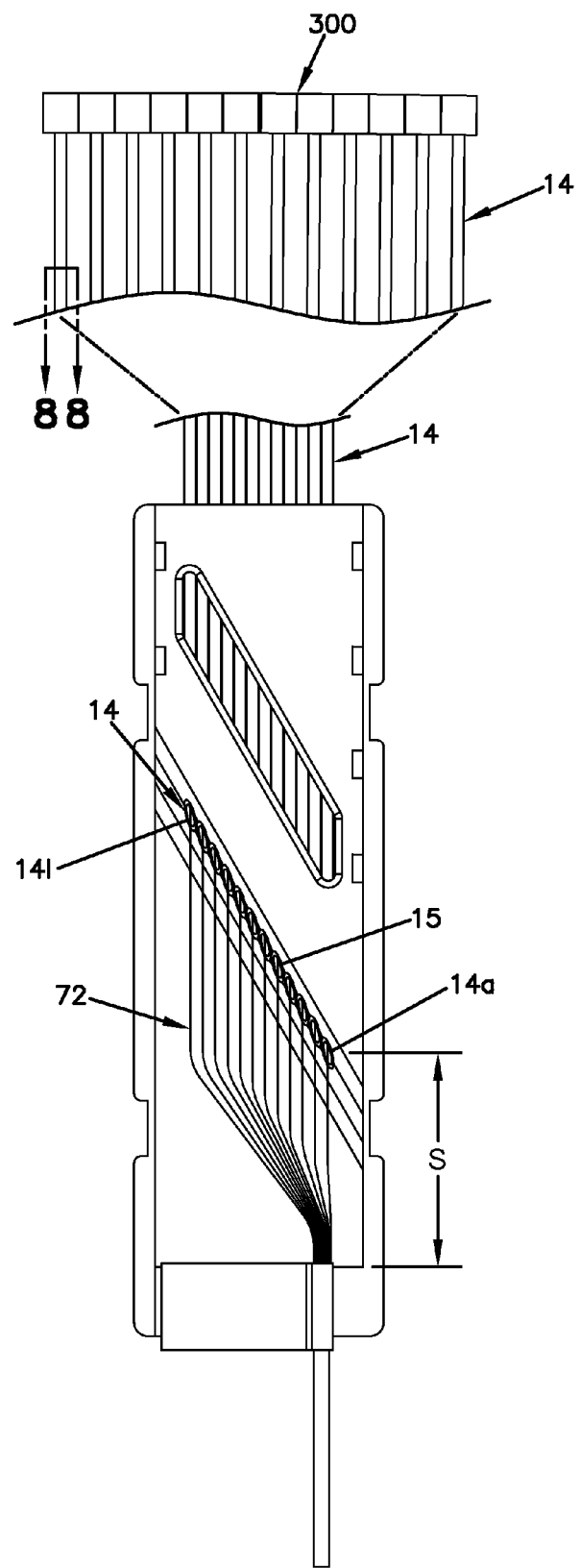
FIG. 6 is a top plan view of a fan-out module showing the furcation tube assembly with optical fibers routed through the fan-out module.

Referring now to FIG. 6, the cable tube 52 is shown with optical fibers 72 routed from the cable tube 52 through the fan-out module 200. The optical fibers 72 may be inserted from the cable tube 52 into the furcation tubes 14 at the first surface end 28 of the furcation tube mounting insert 12. The slanting of the first end surface 28 of the furcation tube mounting insert 12 along the angle θ can help to insert the optical fibers 72 inside the furcation tubes 14. Specifically, the insertion ends 15 of the furcation tubes 14 are positioned at progressively longer longitudinal spacings S from the cable tube end 48 of the fan-out housing 46. The furcation tubes 14 can include twelve furcation tubes 14a-14l. The insertion end 15 of the furcation tube 14a defines the shortest spacing and the insertion end 15 of the furcation tube 14l defines the longest spacing. The furcation tube 14a is in general co-axial alignment with the cable tube 52 while the furcation tubes 14b-14l are progressively laterally offset from the cable tube 52. The slanted configuration of the insertion ends 15 of the furcation tubes 14a-14l facilitates inserting optical fibers into the insertion ends 15 and also enhances fiber routing and bend radius protection within the fan-out housing 46. The slanting of the insertion ends 15 of the furcation tubes 14 along the angle α also assists in inserting fibers in the furcation tubes 14 because t portions of the furcation tubes 14 are cut-away at the insertion ends 15 thereby providing enhanced access to the interiors of the furcation tubes 14 from above.

Figure 8:
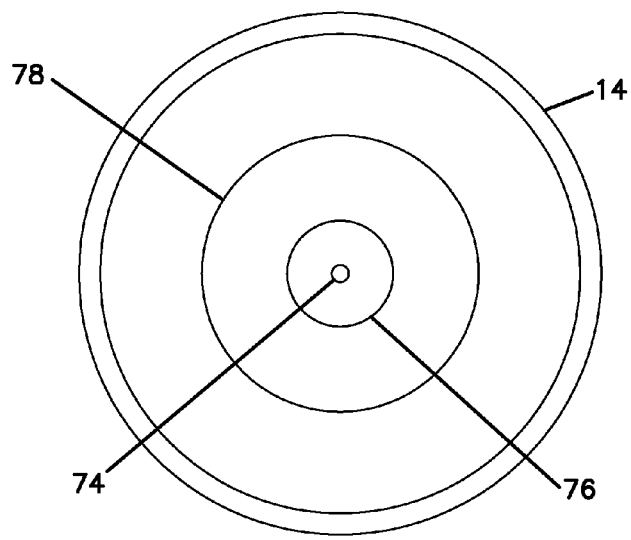
FIG. 8 is a cross-sectional view taken along section line 8-8 of FIG. 6.

The optical fibers 72 extend through the furcation tubes 14 and may include free ends that are connectorized (e.g., see connectors 300) or may be adopted to be spliced to another fiber. As shown, there are twelve furcation tubes 14. The furcation tubes 14 can be about 900 microns in outer diameter and each furcation tube 14 include a single optical fiber 72, as shown in FIG. 8. The optical fiber 72 can be coated. It is understood that there may be more or less furcation tubes 14 that can be utilized according to principles disclosed. In certain embodiments, the fibers 72 can have cores of about 8-12 microns, cladding layers of about 120-130 microns in outer diameter, and coating layers of about 240-260 microns in outer diameter. Other fiber constructions can be used as well.

FIGS. 11 and 12 show one of the furcation tubes 14 of the furcation tube assembly 10 of FIG. 1. The fiber insertion end 15 of the furcation tube 14 includes an end face 400 that is oriented/slanted at an oblique angle relative to the central longitudinal axis 26 of the furcation tube 15. The angling of the end face 400 can be provided by cutting, etching, forming, molding, scoring or otherwise shaping the fiber insertion end 15. The oblique angle is preferably a compound angle including a miter angle/component x and a bevel angle/component y. The miter angle x is defined relative to a horizontal axis 402 that is perpendicular relative to the central longitudinal axis 26. The bevel angle y is defined relative to a vertical axis 404 that is perpendicular to the central longitudinal axis 26. In certain embodiments, both the miter angle x and the bevel angle y can be in the range of 15-45 degrees. In certain embodiments, the furcation tube has an outer diameter in the range of 600-1200 microns or in the range of 800-1000 microns, and an inner diameter larger than 240 microns. In other embodiments, the miter and bevel angles can be outside of the range specified above.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An optical fiber fan-out device comprising:
a furcation tube assembly including a furcation tube mounting insert and an array of furcation tubes, the furcation tube mounting insert including a length that extends between a first end and an opposite second end of the furcation tube mounting insert, the furcation tube mounting insert also including a width that extends between a first side and an opposite second side of the furcation tube mounting insert, the first and second sides of the furcation tube mounting insert extending along the length of the furcation tube mounting insert, the width of the furcation tube mounting insert being perpendicular relative to the length of the furcation tube mounting insert, the furcation tubes having supported portions secured within the furcation tube mounting insert, the supported portions of the furcation tubes defining parallel furcation tube axes that extend along the length of the furcation tube mounting insert, the furcation tube axes being aligned along a plane that extends across the width of the furcation tube mounting insert, the first end of the furcation tube mounting insert having a first end surface that extends across the width of the furcation tube mounting insert between the first and second sides of the furcation tube mounting insert, the first end surface slanting at a compound angle including a miter angle defined relative to a horizontal axis that is perpendicular relative to the furcation tube axes and a bevel angle defined relative to a vertical axis that is perpendicular relative to the furcation tube axes, the supported portions of the furcation tubes having fiber insertion ends that terminate at the first end surface, the furcation tubes also including free portions that extend outwardly from the second end of the furcation tube mounting insert.

2. The optical fiber fan-out device of claim 1, wherein the oblique angle is in the range of 15 degrees to 45 degrees.

3. The optical fiber fan-out device of claim 1, wherein second end of the furcation tube mounting insert includes a second end surface that extends across the width of the furcation tube mounting insert and that is perpendicular relative to the furcation tube axes.

4. The optical fiber fan-out device of claim 1, wherein the furcation tube mounting insert includes a third side and an opposite fourth side that extend across the width and length of the furcation tube mounting insert between the first and second sides of the furcation tube mounting insert, the first and second sides being minor sides and the third and fourth sides being major sides.

5. The optical fiber fan-out device of claim 4, wherein at least one of the third and fourth sides defines a slot for curing UV curable adhesive used to secure the furcation tubes within the furcation tube mounting insert.

6. The optical fiber fan-out device of claim 5, wherein the slot extends across the width of the furcation tube mounting insert and is slanted at an oblique angle relative to the axes of the furcation tubes.

7. The optical fiber fan-out device of claim 6, wherein the furcation tube mounting insert includes first and second pieces between which the supported portions of the furcation tubes are secured.

8. The optical fiber fan-out device of claim 7, wherein the first piece defines the third side of the furcation tube mounting insert, wherein the second piece defines the fourth side of the furcation tube mounting insert, and wherein the first and second pieces cooperate to defines the first end, the second end, the first side and the second side of the furcation tube mounting insert.

9. A fan-out module for fanning out optical fibers from a cable tube, the fan out module including the optical fiber fan-out device of claim 1, the fan-out module also including:
a fan-out housing having a cable tube end and a furcation tube end, the fan-out housing being elongated along a length that extends between the cable tube end the furcation tube end being configured for receiving the cable tube and the furcation tube mounting insert mounting within the fan-out housing with the first end of the furcation tube mounting insert facing toward the cable tube end of the fan-out housing and the second end of the furcation tube mounting insert facing toward the furcation tube end of the fan-out housing, the free portions of the furcation tubes extending outwardly from the furcation tube end of the fan-out housing.

10. The fan-out module of claim 9, wherein the furcation tube mounting insert interlocks with the fan-out housing to limit relative longitudinal movement between the furcation tube mounting insert and the fan-out housing.

11. The fan-out module of claim 10, wherein the first and second sides of the furcation tube mounting insert define notches that receive tabs of the fan-out housing to longitudinally interlock the furcation tube mounting insert relative to the fan-out housing.

12. The fan-out module of claim 11, wherein the fan-out housing includes first and second housing pieces between which the furcation tube mounting insert is mounted, the first housing piece defining a first major side of the fan-out housing, the second housing piece defining a second major side of the fan-out housing that is opposite from the first major side, and the first and second housing pieces cooperating to define the cable and furcation tube ends of the fan-out housing.

13. The fan-out module of claim 12, wherein the cable tube is anchored to the cable tube end of the fan-out housing by adhesive tape secured between the first and second housing pieces.

14. The fan-out module of claim 13, wherein the first housing piece includes tape anchoring projections that pass through the adhesive tape.

15. The fan-out module of claim 12, wherein the first and second housing pieces latch together.

16. The fan-out module of claim 15, wherein the first housing piece includes flexible latches that snap within corresponding catches defined by the second housing piece.

17. The fan-out module of claim 12, wherein the fan-out housing includes mounting latches for securing the fan out housing to another optical component.

18. The fan-out module of claim 17, wherein the fan-out housing includes a mounting latch receptacle for receiving the mounting latch of another fan-out housing to secure the fan-out housings in a stacked relationship.

19. The optical fiber fan-out device of claim 1, wherein the first end surface is angled at a ramp angle relative to vertical.

20. An apparatus for receiving an optical fiber, the apparatus comprising:
a furcation tube defining a central longitudinal axis, the furcation tube having an end including an end face that is slanted at an oblique angle relative to the central longitudinal axis, wherein the oblique angle is a compound angle including a miter angle defined relative to a horizontal axis that is perpendicular relative to the central longitudinal axis and a bevel angle defined relative to a vertical axis that is perpendicular relative to the central longitudinal axis.

* * * * *